United States Patent
Quinn, Jr. et al.

(10) Patent No.: US 8,201,185 B2
(45) Date of Patent: Jun. 12, 2012

(54) COM OBJECT AND MANAGED CODE OBJECT INTEROPERABILITY

(75) Inventors: Thomas E. Quinn, Jr., Seattle, WA (US); Igor Zinkovsky, Bellevue, WA (US); Apurva A. Sinha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 12/147,792

(22) Filed: Jun. 27, 2008

(65) Prior Publication Data

US 2009/0328064 A1     Dec. 31, 2009

(51) Int. Cl.
*G06F 3/00* (2006.01)
*G06F 9/54* (2006.01)

(52) U.S. Cl. .................. 719/313; 719/315; 719/316

(58) Field of Classification Search .................. None
See application file for complete search history.

(56) References Cited

U.S. PATENT DOCUMENTS

| | | | |
|---|---|---|---|
| 6,883,172 | B1 | 4/2005 | Angeline et al. |
| 7,114,148 | B2 | 9/2006 | Irving et al. |
| 7,210,132 | B2 | 4/2007 | Rivard et al. |
| 7,490,332 | B2 * | 2/2009 | Sesma ............ 719/315 |
| 2004/0103114 | A1 | 5/2004 | Sesma |
| 2007/0038986 | A1 | 2/2007 | Houser |
| 2007/0226752 | A1 | 9/2007 | Davis et al. |

OTHER PUBLICATIONS

Vikram, S., "Com and .Net interoperability", May 2002, 5 pages.
MSDN, .NET Framework Developer's Guide, Runtime Callable Wrapper, 2008 Microsoft Corporation, 1 page.
Summit Software, "Rebecca's VSTA Blog", Jul. 2007, 6 pages.
MacDonald, Rob, "Integrating COM with .NET", Sep. 2001, 8 pages.
Nadiminti, Krishna, et al., "ExcelGrid: A .NET Plug-in for Outsourcing Excel Spreadsheet Workload to Enterprise and Global Grids", Jun. 2007, 9 pages.
Cornell, Paul, "Creating Office Managed COM Add-Ins with Visual Studio .NET", Jun. 2002, 8 pages.

* cited by examiner

*Primary Examiner* — Qing Wu
(74) *Attorney, Agent, or Firm* — Workman Nydegger

(57) ABSTRACT

Communicating between managed add-ins and COM hosts. A computing environment includes host objects which may be one of a COM object or a managed code object. The computing environment further includes add-in objects implemented in managed code. Add-in object can provide additional functionality to the host objects. A method includes acts for communicating between add-in objects and host objects. The method includes determining that a first host object to be communicated with is a COM object of a COM host. As a result of determining that a host object to be communicated with is a COM object, incoming and outgoing communications from a managed code add-in are routed through an interop proxy. The interop proxy is implemented in managed code with a managed code add-in. The interop proxy is configured to translate managed code invocations to COM code invocation, and to translate COM code invocations to managed code invocations.

19 Claims, 2 Drawing Sheets

COM OBJECT AND MANAGED CODE OBJECT INTEROPERABILITY

BACKGROUND

Background and Relevant Art

A computer system may provide an environment for execution of a host application. The host application can be implemented to provide certain functionality to a user. Examples of host applications include Microsoft Word for word processing, Microsoft Excel for spreadsheet functionality, Microsoft PowerPoint for presentation functionality (of which each of the preceding are available from Microsoft Corporation of Redmond Wash.), or any one of a number of different host applications. Host applications can be implemented using a number of different technologies. For example, host applications may be implemented using Component Object Model (COM) programming.

Alternatively, host applications may be implemented using managed code programming such as programming implemented using the Microsoft .NET framework. Managed code executes under the management of a virtual machine which can be contrasted with unmanaged code which is executed directly by a computer's central processing unit (CPU). Additionally, some managed code may be contrasted with other code in that the managed code is subject to garbage collection to manage and reclaim memory for objects implemented in the managed code. Programming using managed code may be used to facilitate enhancement of security in that the managed code is executed in a framework which can prevent the managed code from performing unauthorized operations.

Host applications can be enhanced by the use of add-ins. Add-ins are typically implemented using managed code. This is often done to ensure that malicious programs are prevented from causing the add-ins to perform certain operations. Add-ins can extend the functionality of a host program by providing alternative methods of exploiting the functionality of the host application. In particular, the add-ins may be configured to facilitate invoking of functions in the host application. For example, visual basic available for Microsoft corporation of Redmond Wash., may be used to create macros for use in Microsoft excel spreadsheets and Microsoft word documents.

Various tools may be implemented to facilitate the creation and management of add-ins. For example, Visual Studio Tools for Applications (VSTA) provides a set of technologies that enable host applications to host .NET add-ins in a secure, isolated, and version-resilient environment. To guarantee isolation and version resiliency, add-ins execute inside isolated managed code object spaces, known as AppDomains in .NET. Communication with the host is performed through a predefined set of contract protocol interfaces, forming a version-independent communication pipeline. VSTA hides the complexity of this mechanism from add-ins by implementing proxy/adapter components on both sides of the isolation boundary. The dynamic proxy add-in proxy component (illustrated herein as the specific example DynamicProxy) is responsible for packaging object model invocations from add-ins, and sending them through the communication pipeline to the host adapter residing in the default object space of the host. The host adapter component is responsible for receiving the pipeline invocation, and translating it into a late-bound call into the host object model.

The above communication model works effectively when the host object model is either managed or a native COM host. However, add-in communication with COM hosts hits a significant performance cost, because it passes through two isolation boundaries, namely an object space remoting boundary between the add-in proxy and the host adapter, and a COM interop boundary between the host adapter and the host COM component.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment. The computing environment includes host objects which may be one of a COM object or a managed code object. The computing environment further includes add-in objects implemented in managed code. Add-in object can provide additional functionality to the host objects. The method includes acts for communicating between the add-in objects and the host objects. The method includes determining that a first host object to be communicated with is a COM object of a COM host. As a result of determining that a host object to be communicated with is a COM object, incoming and outgoing communications from a managed code add-in are routed through an interop proxy. The interop proxy is implemented in managed code with a managed code add-in. The interop proxy is configured to translate managed code invocations to COM code invocations, and to translate COM code invocations to managed code invocations. The method further includes determining that a second host object to be communicated with is a managed object of a managed code host. As a result of determining that the second host object to be communicated with is a managed object of a managed code host, incoming and outgoing communications are routed from a managed code add-in through a dynamic proxy. The dynamic proxy is configured to communicate through a contract protocol. The contract protocol is configured to communicate with a managed object adapter of a managed host object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

This disclosure introduces a new proxy interop proxy component a specific example of which is sometimes referred to herein as InteropProxy. The InteropProxy provides a communication path for communicating directly with COM hosts. Embodiments may include functionality for eliminating the need for translations of managed object code calls to a contract protocol before being translated to COM object invocations. Further, embodiments may include functionality for supporting, in managed code, COM object eventing exposed by a host. This may allow the InteropProxy to introduce significant performance improvements by removing the object space remoting isolation boundary mentioned above. One way this benefit may be realized is that COM already defines isolation concepts including (but not limited to) strict rules of interface definition and a proxy-stub layer. As such, there is no need for a second layer of isolation logic. Hence, InteropProxy provides for performance improvement by communicating directly with a host's COM objects.

In particular, the following disclosure includes information related to computer implemented mechanisms used by an InteropProxy to obtain a Runtime-Callable Wrapper (RCW) to a COM host object. Further, the disclosure includes information related to computer implemented mechanisms used by an InteropProxy to invoke methods and properties on COM host objects. Further, mechanisms used by the InteropProxy to support COM object events exposed by the host are discussed.

Figure 1:
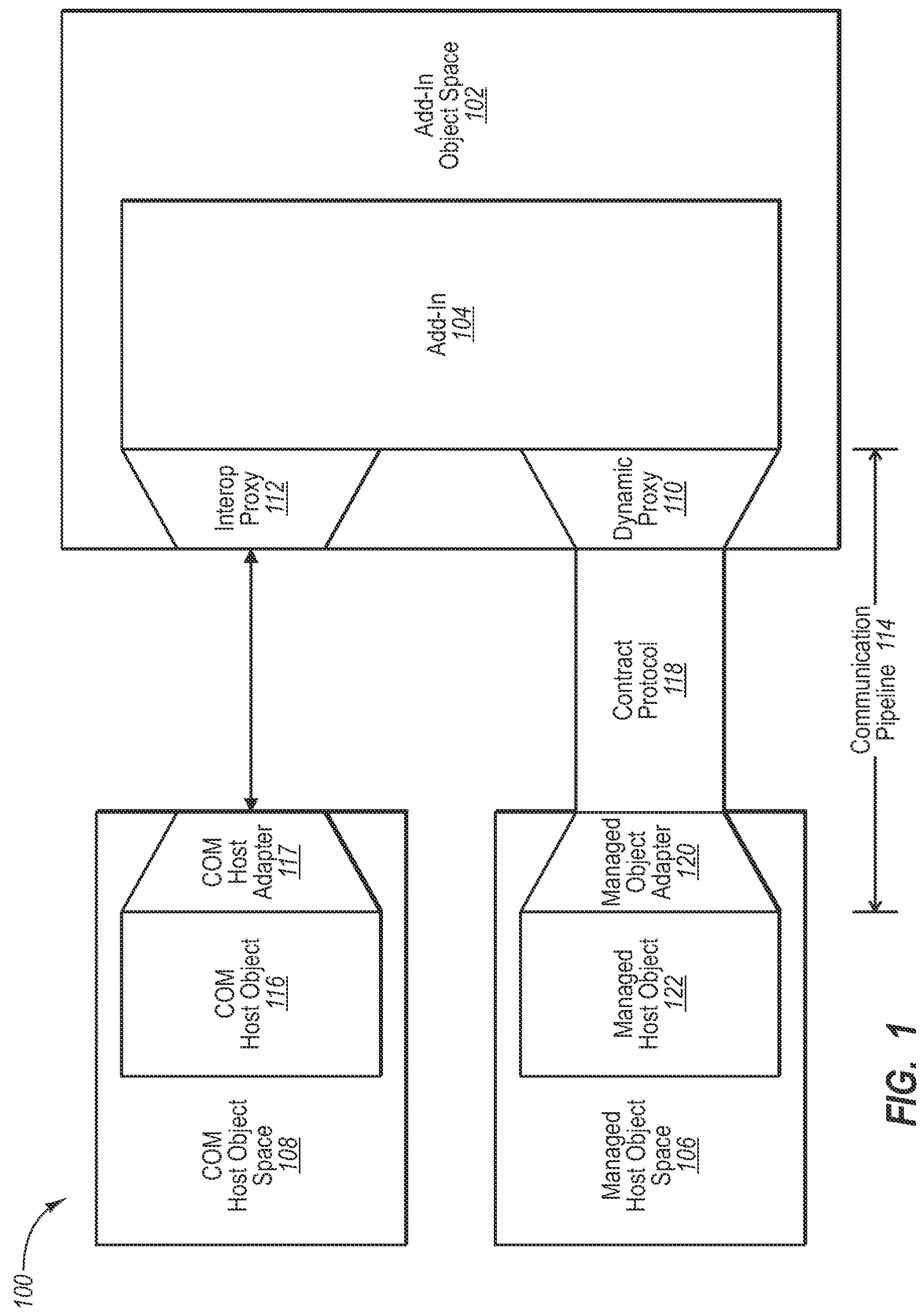
FIG. 1 illustrates object space, objects, and a communication pipeline between objects.

Referring now to FIG. 1, add-in object space 102 is illustrated. The add-in object space is a managed code environment used to implement add-ins 104. Add-ins 104 provide additional functionality to hosts. As described previously, non-limiting examples of hosts are applications such as Microsoft Word for word processing, Microsoft Excel for spreadsheet functionality, Microsoft PowerPoint for presentation functionality, implemented in host object space. Non-limiting examples of add-ins include macros implemented in add-in object space.

Host applications (sometimes referred to herein as hosts) may be implemented using host objects in either managed host object space 106 or COM host object space 108. To communicate with objects in host object space (either managed or COM), add-in proxies are used. The implementation of add-in proxies is divided into two categories: DynamicProxies 110 and InteropProxies 112. DynamicProxies 110 handle add-in communications with managed hosts, while InteropProxies are optimized for communications with COM hosts. In some embodiments, the behavior of the communication pipeline 114 is configured to allow an InteropProxy 112 to obtain COM host object 116 RCWs. This enables the InteropProxy 112 to make direct late-bound calls into COM host objects 116, through a COM host adapter 117 bypassing expensive cross-object space calls into the host adapter, such as calls through the contract protocol 118 and managed object adapter 120 as is illustrated in the portion of the pipeline 114 used for communicating with managed host objects 122 in the managed host object space.

The mechanism for obtaining the application host object is significantly different with InteropProxy. As with DynamicProxy, InteropProxy obtains the host object by calling a function on the pre-defined IHostItemProvider interface implemented by the host in managed code. In this example, the function is IHostItemProviderContract.GetHostObject( ) on the HostItemProvider (which resides in the default object space of the host). The returned object from GetHostObject is an instance of an InteropAdapter illustrated as the COM host adapter 117, whose purpose is to implement a new contract, which in this specific example is referred to herein as IInteropObjectContract2 contract.

IInteropObjectContract2 provides methods for obtaining the IUnknown pointer to the COM host object. In the example illustrated, IInteropObjectContract2 exposes a method, GetIUnknownInProcess( ), that is used when add-ins are hosted in-process with the host. When add-ins are hosted in-process with the host, the add-ins may share the same context as the host. In particular, the host and add-ins may share memory resources in that they share address boundaries. The implementation of this method simply returns the direct IUnknown pointer to the COM host object.

The IInteropObjectContract2 provides another method, MarshalIUnknown( ), that is used when add-ins are hosted out-of-process from the host. It is often useful to host add-ins out-of-process to prevent the add-ins from performing malicious acts or because the add-ins are otherwise un-trusted. For example, if an out-of-process add-in crashes, it will typically not bring the host down with it. The implementation of the MarshalIUnknown( ) method returns an instance of IInteropStreamContract, which allows the COM host object IUnknown interface pointer to be marshaled across the process boundaries.

When add-ins 104 are implemented out-of-process, InteropProxy 112 executes in the address space of the add-in 104, but not the host. This means that in an out-of-process scenario the InteropProxy 112 and the COM host object 116 will reside in different processes. As a result the COM object reference that the InteropProxy 112 holds is not a direct IUnknown pointer to the COM object (as in in-process scenarios), but rather a pointer to marshaled COM proxy object which resides in the same process as the InteropProxy 112 and uses remote procedure calls to make cross-process invocations on the COM host object 116 in the host process.

The InteropProxy 112 calls IHostItemProviderContract.GetHostObject when it first needs to access the COM object. This call returns an instance of IInteropObjectContract2 which, as described above, provides through the COM host adapter 117 two methods for obtaining the actual COM object: GetIUnknownInProcess and MarshalIUnknown. As previously noted GetIUnknownInProcess is used for in-process hosting scenarios, and simply returns a direct IUnknown pointer to the COM object. MarshalIUnknown is used when add-ins are hosted outside of the host process, and instead returns an instance of IInteropStreamContract. The implementation of MarshalIUnknown uses CoMarshalInterface, which is part of COM application programming interface (API), to create an instance of IStream object which will later be used to create a COM proxy object inside the InteropProxy 112 process. IInteropStreamContract is used to transport the IStream object across the process boundary into the InteropProxy 112 process, where the InteropProxy 112 uses CoUnmarshalInterface, also part of COM API, to create a COM proxy object based on the IStream object that was passed across. Once the COM proxy object is created, the InteropProxy obtains its IUnknown pointer, and uses it to make invocations on the COM object as though it was a direct pointer. The COM proxy object uses remote procedure calls to make cross-process invocations into the COM host object. This behavior is part of the COM specification and implementation IStream is a COM interface, and when it is transported across the process boundary through remoting, the remoting infrastructure creates a transparent proxy for it. A call to IStream::Read requires passing in a pointer to a buffer into which to read the data. However, the remoting is not able to marshal this pointer because the managed definition of the IStream interface defines it as a byte array. To solve this issue IInteropStreamContract was introduced with similar, but modified method signatures so that the remoting infrastructure could properly marshal the data that is being read. IInteropStreamContract is adapted into IStream interface in the InteropProxy process and passed into CoUnmarshalInterface.

As mentioned above, embodiments enable the InteropProxy 112 to hold a direct reference to the COM host object RCW. This allows the InteropProxy 112 to make invocations directly on the COM object 116 and to bypass expensive cross-object space calls into the COM host adapter 117. InteropProxy 112 performs invocations on the COM object 116 using COM object invocations are performed through Type.InvokeMember( ) method, which uses CLR's COM Interop layer to perform the actual IDispatch.Invoke( ).

Once the IUnknown pointer to the COM host object is obtained—there are no more cross-object space calls. All calls into the host object model will now be invoked directly on the COM object. To communicate to the COM object from managed code the InteropProxy 112 creates an RCW using Marshal.GetObjectFromIUnknown( ).

Because add-ins 104 are isolated from host object models, the InteropProxy 112 converts any arguments supplied by the add-ins 104 during invocations into something that the host understands. In one example of this, a COM host method takes an interface pointer to another COM object as one of its arguments. The add-in's representation of that COM object will be provided by another InteropProxy 112 instance, which will be unwrapped into an RCW by the calling InteropProxy 112 so that it can be passed-in as an argument to Type.InvokeMember( ). Similarly, when COM methods return interface pointers to other COM objects, the InteropProxy 112 wraps those interface pointers with new instances of InteropProxy 112 before they are returned to the add-in 104.

As described above, the InteropProxy 112 ensures that add-ins do not directly interact with the host object model. This becomes more complicated when object models expose events. Specifically, hosts could expose events that pass interface pointers to other COM objects when invoking event handlers.

Host object models often expose a set of events through which add-ins can receive notifications of certain actions occurring in the host (eg: FileOpened event). Event registration and event handling mechanisms are often vastly different between .NET or other managed code and COM. InteropProxy provides a mechanism which translates event registration and handling between managed code add-ins and COM hosts.

COM events are typically exposed in groups. The COM eventing model requires the event receiver object, called an event sink, to register it-self for a particular host event interface, called a source interface, and handle all events fired by the host that are associated with that interface. The relationship of an event sink object to actual events is one-to-many, i.e. where there is one event sink that handles many events. The actual invocation of event handlers is performed through IDispatch interface, which is implemented by event sink objects. Each event is identified by a unique number, which is passed to IDispatch::Invoke during the invocation.

.NET or other managed code eventing models are based on delegates rather than event sinks. A delegate is a callable object in managed code which acts as an event receiver for managed code events. Unlike a COM event sink, some managed code delegates only handle one specific event for which it has been registered. The relationship of a managed code delegate object to actual events is one-to-one, i.e. where there is one delegate object that handles a specific event.

Some embodiments include a mechanism through which the InteropProxy 112 creates its own event sinks when add-ins wish to subscribe to host events. Some implementations of the InteropProxy event sink perform similar to applications of add-ins making invocations on the host object model. Any interface pointers that are passed-into InteropProxy event sinks by the host will be wrapped with new instances of InteropProxy 112 before the actual add-in event handler is invoked. Similarly, and as illustrated above where add-ins invoke a function on a host COM object, out parameters that the event handler assigns will be unwrapped from InteropProxy 112 instances into RCWs before the event sink implementation returns to the host.

InteropProxy 112 provides a mechanism through which COM-based host events are exposed as managed code delegate-based events to managed code add-ins. The mechanism includes several parts. One part is an event sink. InteropProxy 112 creates an event sink object (which implements IDispatch interface), and registers it with the COM host. The COM host will fire all events on this event sink object. Another part is a managed code delegate map. InteropProxy 112 maintains an internal list of registered delegates, which are registered by the add-in for certain host events, and maps each delegate to a COM event identifier. When a COM event is fired by the host the InteropProxy event sink receives the invocation, finds the appropriate delegate object (if one exists) from the delegate map, and performs the delegate invocation into the add-in.

The following discussion now refers to a number of methods and method acts that may be performed. It should be noted, that although the method acts may be discussed in a certain order, or illustrated in the drawings in a certain order, no particular ordering is necessarily required unless specifically stated, or required because an act is dependent on another act being completed prior to the act being performed.

Figure 2:
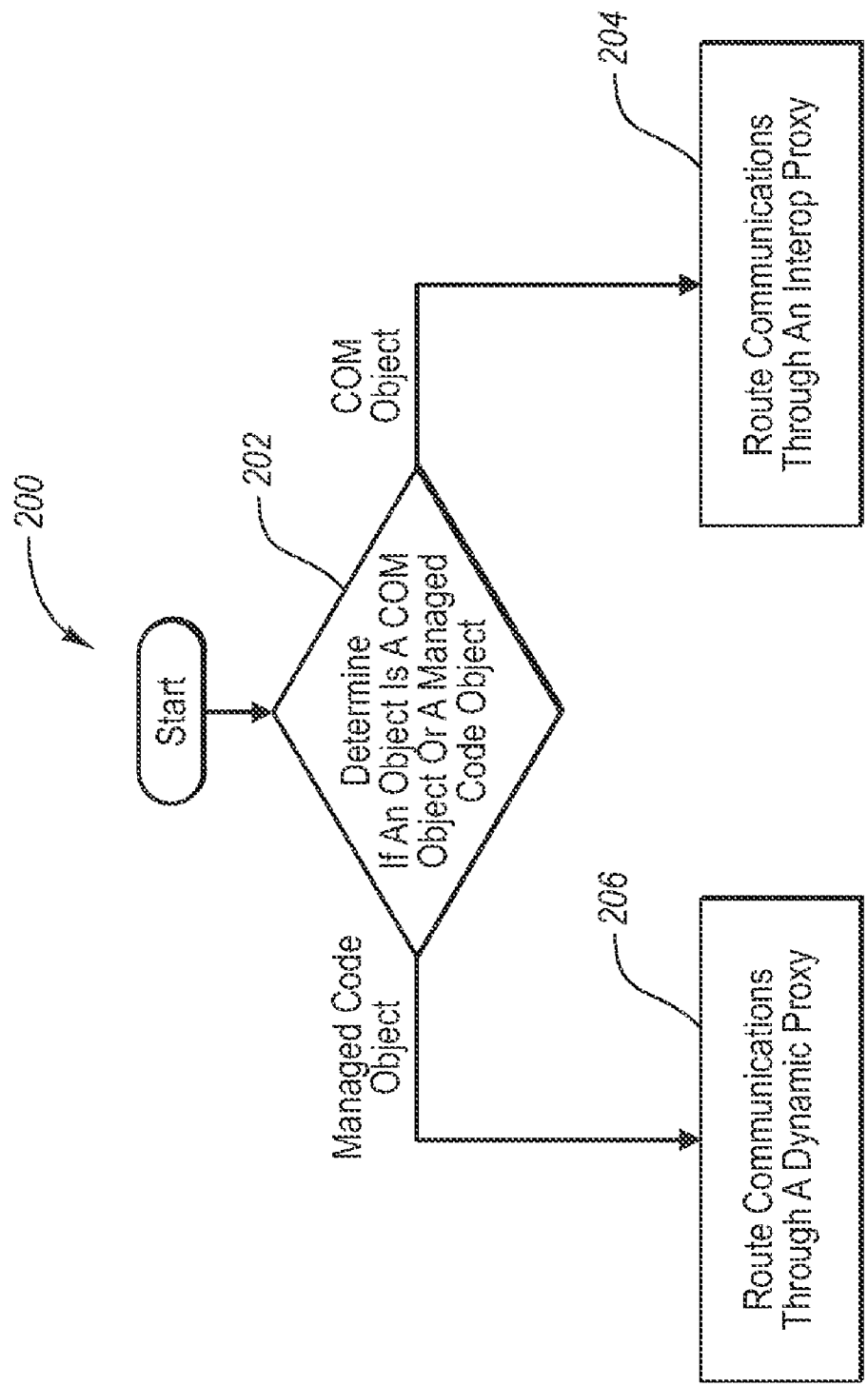
FIG. 2 illustrates a method of communicating between object.

Referring now to FIG. 2, a method 200 is illustrated. The method 200 may be practiced in a computing environment. The computing environment includes host objects. The host objects may be one of a COM object, such as COM host object 116 illustrated in FIG. 1, or a managed code object, such as managed code host object 122 illustrated in FIG. 1. The computing environment further includes add-in objects implemented in managed code. Add-in object can provide additional functionality to the host objects. The method 200 includes acts for communicating between the add-in objects and the host objects. The method 200 includes determining that a first host object to be communicated with is a COM object of a COM host (act 202). As a result of determining that the first host object to be communicated with is a COM object, the method 200 includes routing incoming and outgoing communications through an interop proxy (act 204). As illustrated in FIG. 1, when an add-in 104 communicates with COM host objects 116, the InteropProxy 112 is used. The InteropProxy 112 is implemented in managed code with the managed code add-in 104. The InteropProxy 112 is configured to translate managed code invocations to COM code invocation, and to translate COM code invocations to managed code invocations. Notably, in some embodiments, all incoming and outgoing communications may be routed through an interop proxy The method 200 may further include obtaining a runtime-callable wrapper to the COM object. In this embodiment, routing incoming communications through an interop proxy (act 204) includes making direct late-bound calls into COM host objects using the runtime-callable wrapper to the COM object.

To facilitate making calls into the COM object, the method 200 may further include obtaining a direct IUnknown pointer to the COM object when the managed code add-in is implemented in the same process as the COM object. Alternatively, the method 200 may further include obtaining a pointer to marshaled COM proxy object which resides in the same process as the interop proxy and uses remote procedure calls to make cross-process invocations on the COM object when the managed code add-in is implemented in a different process from the COM object.

The method 200 further illustrates at act 202 determining that a second host object to be communicated with is a managed object of a managed code host. As a result of determining that the second host object to be communicated with is a managed object of a managed code host, the method 200 includes routing incoming and outgoing communications through a dynamic proxy (act 206). For example, FIG. 1 illustrates the add-in 104 communicating with the managed host object 122 through a DynamicProxy 110. The DynamicProxy 110 is configured to communicate through a contract protocol 118. The contract protocol 118 is configured to communicate with a managed object adapter 120 of a managed host object.

In particular, the contract protocol 118 defines communication between managed code objects. By recognizing when a host object is a COM object, conversion of messages to messages conforming with the contract protocol 118 can be avoided as shown where the InteropProxy 112 communicates directly with the COM host adapter 117 of the COM host object 116. In particular, InteropProxy 112 communicates with COM host adapter 117 initially to obtain the IUnknown pointer of the IStream instance, as described above. After that point, all communication is directed to the COM host object 116, through the RCW for the COM host object.

To handle the different eventing models between COM hosts and managed code add-ins, the method 200 illustrated in FIG. 2 may further include act of at the interop proxy, registering an event sink with the COM host. The event sink is configured to receive events emitted by the COM host. Additionally, the method 200 may include maintaining an internal list of registered delegates at the interop proxy. To handle the COM model of exposing events in groups in managed code models that are based on delegates, each delegate in the list of registered delegates is registered by the add-in for a given host event at an event level. The internal list of registered delegates maps each delegate to a COM event identifier.

Embodiments of the present invention may comprise or utilize a special purpose or general-purpose computer including computer hardware. For example, COM hosts and add-ins described previously may be implemented using computing system comprising appropriate hardware and/or software including processors, memory, storage, operating systems, application software or other hardware or software. Additionally components may be implemented on each their own separate stand-alone computer system including individualized hardware where the machines are interconnected through network communication channels or other communication channels. Alternatively, components may be implemented on a common shared computer system, where the machines share resources, such as processor resources, memory resources, storage resources, or other resources.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, the computing environment comprising host objects wherein the host objects may be one of a COM object or a managed code object, the computing environment further comprising add-in objects implemented in managed code, wherein add-in object can provide additional functionality to the host objects, a method of communicating between the add-in objects and the host objects, the method comprising:
    determining that a first host object to be communicated with is a COM object of a COM host;
    as a result of determining that a host object to be communicated with is a COM object, routing incoming and outgoing communications from a managed code add-in through an interop proxy, wherein the interop proxy is implemented in managed code with a managed code add-in, and wherein the interop proxy is configured to translate managed code invocations to COM code invocations, and to translate COM code invocations to managed code invocations;
    determining that a second host object to be communicated with is a managed object of a managed code host; and
    as a result of determining that the second host object to be communicated with is a managed object of a managed code host, routing incoming and outgoing communications from a managed-based add-in through a dynamic proxy, wherein the dynamic proxy is configured to communicate through a contract protocol, the contract protocol configured to communicate with a managed object adapter of a managed host object.

2. The method of claim 1, further comprising at the interop proxy, registering an event sink with the COM host, the event sink being configured to receive events emitted by the COM host.

3. The method of claim 2, further comprising maintaining an internal list of registered delegates at the interop proxy, wherein each delegate in the list of registered delegates is registered by the add-in for a given host event at an event level.

4. The method of claim 3, wherein the internal list of registered delegates maps each delegate to a COM event identifier.

5. The method of claim 1, further comprising obtaining a runtime-callable wrapper to the COM object.

6. The method of claim 5, wherein routing incoming communications through an interop proxy comprises making direct late-bound calls into COM host objects using the runtime-callable wrapper to the COM object.

7. The method of claim 1, further comprising obtaining a direct IUnknown pointer to the COM object when the managed code add-in is implemented in the same process as the COM object.

8. The method of claim 1, further comprising obtaining a pointer to marshaled COM proxy object which resides in the same process as the interop proxy and uses remote procedure calls to make cross-process invocations on the COM object when the managed code add-in is implemented in a different process from the COM object.

9. In a computing environment, the computing environment comprising host objects wherein the host objects may be one of a COM object or a managed code object, the computing environment further comprising add-in objects implemented in managed code, wherein add-in object can provide additional functionality to the host objects, a method of communicating between the add-in objects and the host objects, the method comprising:
    at a COM host object space that includes a COM host object receiving a request from an add-in, implemented in managed code, for the COM host object; and
    returning a host adapter, the host adapter comprising functions for obtaining an IUnknown pointer to the COM host object including:
        a first function callable to obtain the IUnknown pointer to the COM host object when the add-in is implemented in-process with the COM host object; and
        a second different function callable to obtain the IUnknown pointer to the COM host object when the add-in is implemented out-of-process with the COM host object.

10. The method of claim 9, wherein the first function returns the direct IUnknown pointer.

11. The method of claim 9, wherein the second function returns a pointer to a marshaled COM proxy object which uses remote procedure calls to make cross-process invocations on the COM host object.

12. The method of claim 11, wherein returning a pointer to a marshaled COM proxy object comprises transporting an IStream object from a host process to an add-in process and using a COM application programming interface to create a proxy object for the COM host object in the host process.

13. In a computing environment, the computing environment comprising host objects wherein the host objects may be one of a COM object or a managed code object, the computing environment further comprising add-in objects implemented in managed code, wherein add-in object can provide additional functionality to the host objects, a method of communicating between the add-in objects and the host objects, the method comprising:
    determining that a host object to be communicated with is a COM object of a COM host;
    as a result of determining that a host object to be communicated with is a COM object, routing incoming and outgoing communications from a managed code add-in through an interop proxy, wherein the interop proxy is implemented in managed code with the managed code add-in, and wherein the interop proxy is configured to translate managed code invocations to COM code invocation, and to translate COM code invocations to managed code invocations, without first translating to a managed code contract protocol; and
    obtaining a direct IUnknown pointer to the COM object when the managed code add-in is implemented in the same process as the COM object.

14. The method of claim 13, further comprising at the interop proxy, registering an event sink with the COM host, the event sink being configured to receive events emitted by the COM host.

15. The method of claim 14, further comprising maintaining an internal list of registered delegates at the interop proxy, wherein each delegate in the list of registered delegates is registered by the add-in for a given host event at an event level.

16. The method of claim 15, wherein the internal list of registered delegates maps each delegate to a COM event identifier.

17. The method of claim 13, further comprising obtaining a runtime-callable wrapper to the COM object.

18. The method of claim 17, wherein routing incoming communications through an interop proxy comprises making direct late-bound calls into COM host objects using the runtime-callable wrapper to the COM object.

19. In a computing environment, the computing environment comprising host objects wherein the host objects may be one of a COM object or a managed code object, the computing environment further comprising add-in objects implemented in managed code, wherein add-in object can provide additional functionality to the host objects, a method of communicating between the add-in objects and the host objects, the method comprising:

determining that a host object to be communicated with is a COM object of a COM host;

as a result of determining that a host object to be communicated with is a COM object, routing incoming and outgoing communications from a managed code add-in through an interop proxy, wherein the interop proxy is implemented in managed code with the managed code add-in, and wherein the interop proxy is configured to translate managed code invocations to COM code invocation, and to translate COM code invocations to managed code invocations, without first translating to a managed code contract protocol; and obtaining a pointer to a marshaled COM proxy object which resides in the same process as the interop proxy and uses remote procedure calls to make cross-process invocations on the COM object when the managed code add-in is implemented in a different process from the COM object.

* * * * *